Oct. 22, 1935.  E. McCORMICK  2,018,184
TRACTOR
Filed Nov. 27, 1933   2 Sheets-Sheet 2
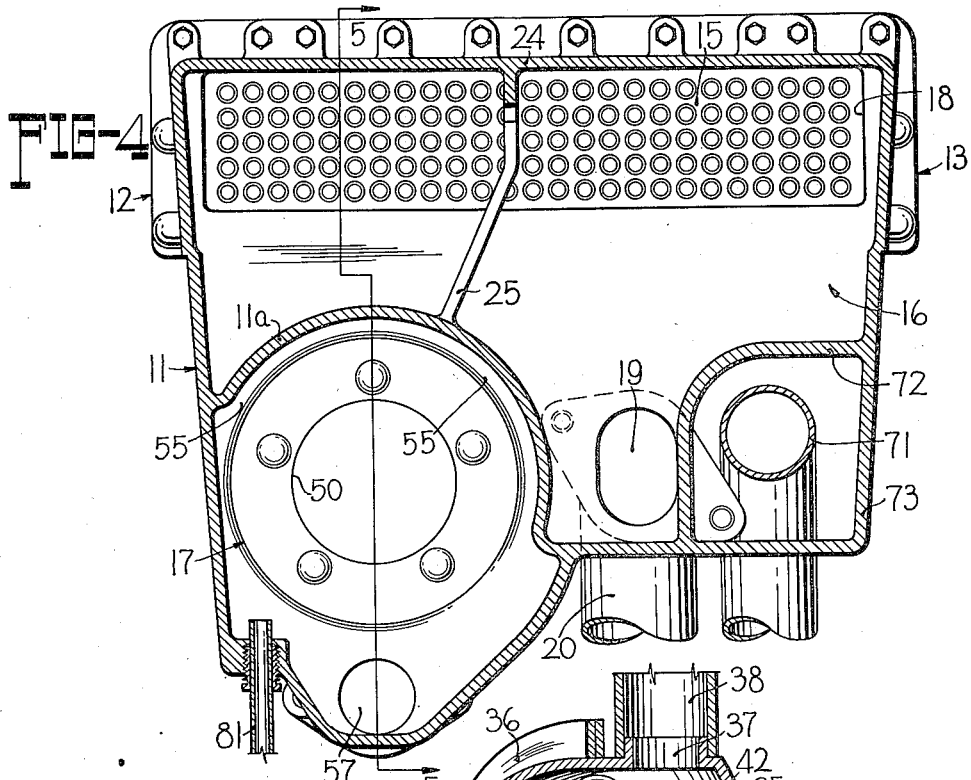
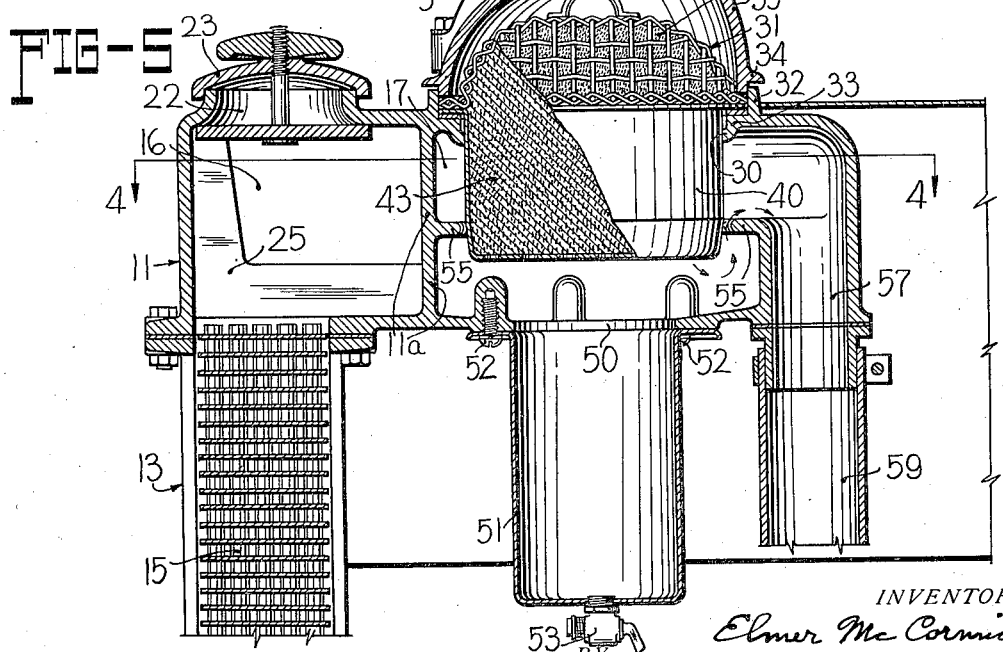
INVENTOR
Elmer McCormick
BY Brown, Jackson, Boettcher & Dienner
ATTORNEYS Patented Oct. 22, 1935

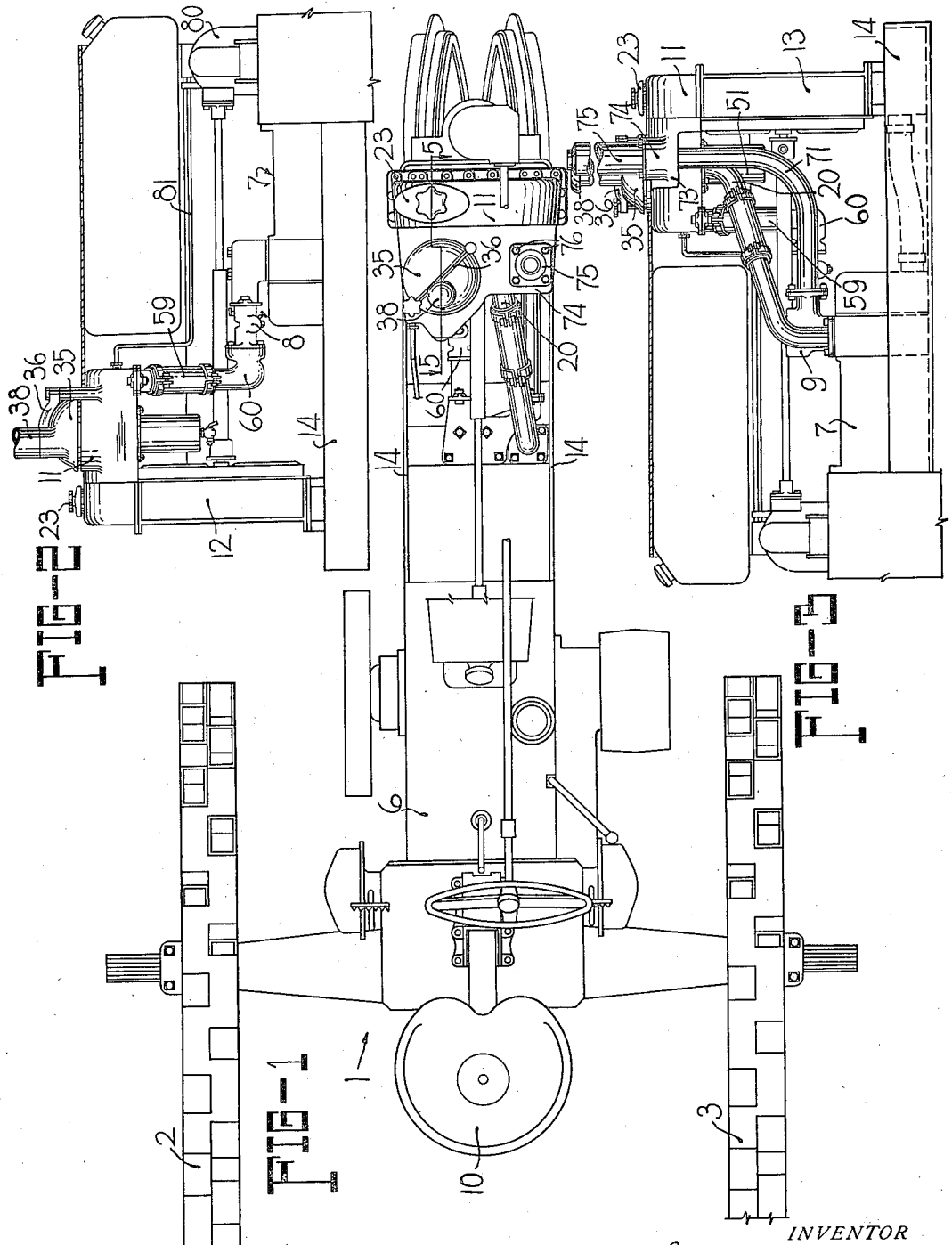

2,018,184

UNITED STATES PATENT OFFICE 2,018,184

TRACTOR

Elmer McCormick, Waterloo, Iowa, assignor to John Deere Tractor Company, Waterloo, Iowa, a corporation of Iowa Application November 27, 1933, Serial No. 699,867

17 Claims. (Cl. 123—198)

The present invention relates generally to improvements in tractors, and is particularly concerned with the provision of a tractor in which certain of the component parts thereof are supported and arranged in a simplified manner, providing for improved visibility for the operator and, at the same time, greater rigidity and sturdiness for the parts.

In farm tractors of more or less conventional construction internal combustion engines are employed, and in this connection it is desirable to provide the carburetor of the tractor with air intake means, generally in the form of a relatively tall intake pipe, so disposed as to draw in air which is comparatively free from dust, grit and the like. For this purpose, generally the intake end of said pipe is disposed at a considerable distance above the ground so as to be disposed above dust raised by the operation of the machine. Likewise, the muffler and exhaust pipe are so disposed as to discharge the exhaust gases at a point relatively high above the machine so that all fumes from the motor are carried well up over the operator's head.

The principal object of the present invention is the provision of improved supporting means for the exhaust and intake conduits and associated parts whereby, not only are they rigidly supported in an improved manner but they are supported in a way which increases the effective visibility of the operator.

Most tractors are arranged to receive a cultivator or like implement at the front end, and in tractors of this type it is desirable that the body of the tractor be as narrow as possible in order that the operator may have a clear unobstructed view of the plants being cultivated, and especially is this true of the plants directly ahead of the front tools, for if the operator has a good view of these plants he can guide the tractor better so as to dodge misaligned hills.

In this connection, it is also an important object of the present invention to provide supporting means for the exhaust and intake conduits of the tractor so that no part of these conduits projects out laterally from the tractor to interfere with the operator's view of the plants directly ahead of the tractor.

More specifically, it is the purpose of the present invention to provide a radiator head member formed with means for supporting the exhaust and intake conduits and the associated muffler and air cleaner in such a manner that all of these parts are disposed within lines extending from the operator's position on the tractor to the edges of the radiator. One advantage of this construction is that it provides an unobstructed line of vision forwardly from the operator's position along both sides of the tractor. Another advantage is that making the radiator head and the air cleaner housing as a single casting provides not only a less expensive construction but also a more rigid construction than would be possible if these two elements were made as separate castings. A third advantage of this construction is that the air cleaner is located in a desirable position with respect to the carburetor, namely, above and slightly ahead of but relatively close to the carburetor, so that the connection to the carburetor can be made through a single conduit with no sharp turns therein. It is desirable, as will be recognized, to have as few turns or bends as possible in the conduit leading to the carburetor.

These and other objects and advantages of the present invention will be apparent to those skilled in the art after a consideration of the following detailed description of the preferred construction in which the principles of the present invention have been embodied, taken in conjunction with the accompanying drawings illustrating such construction.

In the drawings:

Figure 1 is a top plan view of a tractor embodying the principles of the present invention;

Figures 2 and 3 are side views of the front end of the tractor shown in Figure 1, Figure 2 being taken from the left hand side of the machine, while Figure 3 shows the right hand side;

Figure 4 is a section, taken along the line 4—4 of Figure 5, showing certain details of the radiator head casting on an enlarged scale; and Figure 5 is a vertical section on the same scale as Figure 4 and corresponding to sections taken along the lines 5—5 of Figures 1 and 4.

Referring now to the drawings, the reference numeral 1 indicates a tractor of the wide tread type, embodying relatively widely spaced traction wheels 2 and 3 and closely spaced front wheels 4 forming what is generally termed a front steering truck. Tractors of this type are generally formed with a long narrow body indicated, as an entirety, by the reference numeral 6. At the front end, the body or frame 6 carries an internal combustion engine 7 having a carburetor 8 and an exhaust manifold 9. At the rear of the frame or body 6 an operator's seat 10 is provided.

According to the present invention, a combined radiator head and air cleaner housing, indicated by the reference numeral 11, is provided in the form of an integral casting. Preferably, this casting is supported from side members 12 and 13 of the radiator, the side members 12 and 13 being supported from longitudinally extending sills 14 constituting a part of the tractor body or frame 6. The radiator proper, or radiator core, is indicated by the reference numeral 15, as best shown in Figures 4 and 5, and is disposed between the side members 12 and 13.

The radiator head casting 11 is divided into two separate compartments or chambers by means of an intermediate wall 11a, this intermediate wall thus dividing the radiator head member into a water reservoir compartment or chamber 16 and an air cleaner housing compartment 17. The water chamber 16 is provided with an opening 18 in the bottom wall thereof to receive the upper end of the radiator core 15. The lower wall of the water chamber 16 is provided with a second opening 19 over which the conduit 20 from the water jacket of the motor 7 is fixed. The water compartment 16 is also provided with the usual filler opening 22 normally closed by means of a radiator cap 23. A front wall of the radiator head casting and of the water compartment 16 is indicated by the reference numeral 24, and this wall is connected with the intermediate wall 11a by means of a reenforcing web 25, best shown in Figure 5, which strengthens the radiator head casting.

The air cleaner compartment 17 has a circular opening 30 at the top in which the air cleaning core 31 is disposed. An upstanding cylindrical flange 32 having an inwardly extending shoulder 33 is provided around the margin of the opening 30. The shoulder 33 forms a support for the outwardly extending supporting flange 34 of the air cleaner core 31. The core 31 is held in position by means of a semi-spherical cap 35 disposed over the openings 30 and held in place by a clamp 36. An opening 37 is provided in the top of the cap 35 near one side of which a stack 38 is disposed.

The core 31 itself comprises a cup portion 40, the bottom of which is perforated with a number of holes 41. A dome-shaped screen 42 is provided over the top of the cup 40. The cup 40 is packed with air cleaning moss 43. For a purpose which will appear later, the incoming air can enter the core 31 through the dome shaped screen 42 and can leave the core only through the openings 41 in the lower end of the core, the intermediate portion of the cup 40 being cylindrical and is not provided with any openings therein.

A circular opening 50 is provided in the bottom of the air cleaner housing 17 and over this opening a cup or receptacle 51 is fixed by means of screws 52. A pet cock 53 is provided on the bottom of the cup 51 to provide for draining the receptacle 51.

The air cleaner housing 17 is divided into an upper and a lower portion by means of an inwardly extending web 55, the inner margin of which is spaced a short distance from the core 31. It will be noted that the opening thus formed by the web 55 is in axial alignment with the openings 30 and 50 disposed, respectively, in the upper and lower walls of the air cleaner compartment. An air passage 57, formed integral with the casting 11, leads from the upper portion of the compartment 17 above the web 55 and is connected to the carburetor 8 by means of a conduit 59 and an elbow 60, as best shown in Figure 2.

When the motor 7 is in operation, air is drawn in through the cleaning core 31, which is saturated with oil, and passes out through the openings 41, up through the space between the inner margin of the web 55 and the outside of the core 31 through the passage 57 and through the conduit 59 and the elbow 60 to the carburetor 8. As air passes through holes 41 down and around and up between the core 31 and the inner margin of web 55, oil, which may have been drawn out of the filter element 31 and carried along with the air, is separated from the air and drops into the receptacle 51 or onto the sloping lower wall of the cleaner compartment 17, from where it runs through opening 50 into the cup 51, together with any oil which drips from the cleaner core 3. The oil which is thus collected may be drawn off from time to time by opening the pet cock 53.

The exhaust from the motor 7 is led upwardly from the exhaust manifold 9 through an exhaust pipe and muffler construction which is supported on the radiator head casting 11 in such a manner and in such a position that the visibility of the operator is not restricted. An exhaust pipe 71 is connected at its lower end with the exhaust manifold 9 of the motor, and is so curved that its upper portion extends upwardly through an opening provided in the radiator head casting inside the right hand wall thereof, as best shown in Figure 4. The compartment or chamber section of the radiator head casting 11 which receives the exhaust pipe 71 is formed in part by an inwardly curved wall 72, which also forms one portion of the outer or rear wall of the water reservoir compartment 16, and in part by a wall 73 which defines the rear right hand portion of the casting 11. The walls 72 and 73 converge at the top and merge into a rectangular enclosure 35 or boss 74 of the top of which a stack or muffler 75 is bolted, as by bolts 76.

As best shown in Figures 1 and 4, the air intake pipe 38 and the exhaust pipe or muffler 75 are disposed between the generally vertical planes in which the side walls of the radiator head casting are disposed. It will also be observed that these side walls converge rearwardly to a slight extent and along lines of vision extending from the operator's seat 10 to the sides 12 and 13 of the radiator. At the same time, the air intake and exhaust conduits, and associated parts, are rigidly supported.

The provision of an air cleaner compartment 17 in the position described above makes it possible to draw off fumes from the crank case of the motor 7 in a relatively simple manner. To this end, the dome-shaped governor housing 80, forming a part of the motor 7, is connected through a pipe 81 with the upper section of the air cleaner housing 17, this being the section from which the air from the cleaner housing passes into the conduit or passage 57. Thus, oil fumes rising in the dome-shaped governor housing are conducted through the pipe 81 into the air cleaner housing from which the volatile portions thereof are drawn into the carburetor while the oil precipitant therefrom flows downwardly into the receptacle 51 and can be periodically drawn off with the oil from the cleaner core which collects in the receptacle.

While I have described above the preferred construction in which the principles of the present invention have been embodied, it will be understood that my invention is not to be limited to the specific details shown and described above, but that, in fact, widely different means may be employed in the practice of the broader aspects of my invention.

What I claim, therefore, and desire to secure by Letters Patent is:

1. In a tractor motor having a water jacket and carburetor, the combination of a radiator including a core, a radiator head connected with the core and including a water chamber communicating with the core and an air chamber formed in said head, an air cleaner disposed within and carried by the air chamber within said radiator head, conduit means connecting said air chamber with said carburetor, and conduit means connecting the water chamber of the radiator head with the water jacket of said motor.

2. In a tractor motor having a water jacket and an exhaust manifold, the combination of a radiator for said motor including a radiator head having a water chamber communicating therewith, conduit means connecting said water chamber with the water jacket of said motor, an exhaust muffler supported upon the radiator head, and conduit means connecting said muffler with said exhaust manifold.

3. In a tractor motor having a water jacket, a carburetor, and an exhaust manifold, the combination of a radiator for said motor including radiator head having an air chamber formed therein, air cleaning means supported within said chamber, conduit means connecting said chamber with the carburetor of said motor, an exhaust muffler supported on said radiator head, conduit means connecting said muffler with said exhaust manifold, and means establishing communication between the radiator and said water jacket.

4. In a tractor motor having a carburetor, a water jacket and an exhaust manifold, the combination of a radiator for the motor and including a radiator head having side walls coinciding generally with the sides of the radiator, an air chamber formed in said radiator head inwardly of one side wall thereof, air conditioning means disposed in said chamber, conduit means connecting the lower portion of said chamber with said carburetor, an exhaust muffler carried by said head inwardly of the other side wall of the latter, conduit means connecting said muffler with said exhaust manifold, a water chamber formed in said radiator head and including a portion disposed between said air chamber and the portion of the radiator head carrying said muffler, and conduit means connecting the last named portion of the water chamber with the water jacket of said motor.

5. In a tractor motor having a crank case, a water jacket, and a carburetor, the combination of a radiator for the motor including a radiator head having a water chamber and a separate air chamber, air conditioning means disposed in said air chamber, conduit means leading from said air chamber to said carburetor, separate conduit means leading from said water chamber to the water jacket of the motor, and means establishing communication between said air chamber and the crank case of said motor to provide for the withdrawal of gases therefrom.

6. In a tractor motor having a water jacket and a carburetor, the combination of a radiator casting divided into a water compartment and an air cleaner compartment, the water compartment having a core receiving opening, a second opening in the water compartment, a conduit leading from the water jacket of the motor and fixed to said casting over said second opening, the air cleaner compartment having an opening at the top for receiving an air cleaner core, another opening leading into said air cleaner compartment, and a conduit connecting the latter opening with the carburetor of the motor, the sides of said casting being confined within lines extending from the operator's position on the tractor to the sides of the radiator to provide an unobstructed view to the operator on both sides of the tractor.

7. In a tractor motor having a water jacket, a carburetor, and an exhaust manifold, the combination of a radiator casting divided into a water compartment and an air cleaner compartment, the water compartment having a core receiving opening, a second opening in the water compartment, a conduit leading from the water jacket of the motor and fixed to said casting over said second opening, the air cleaner compartment having an opening at the top for receiving an air cleaner core, another opening leading into said air cleaner compartment, a conduit connecting the latter opening with the carburetor of the motor, an exhaust pipe connected to the exhaust manifold of the motor and extending forwardly and upwardly, one wall of said casting being curved inwardly to provide a space to receive said exhaust pipe, an exhaust stack carried by said casting above said space to which the upper end of said exhaust pipe is connected, the two sides of said casting being confined within lines extending from the operator's position to the sides of the radiator to provide an unobstructed view of the operator on both sides of the tractor.

8. In a tractor motor having a water jacket, a carburetor, and an exhaust manifold, the combination of a combined radiator head and air cleaner housing comprising a casting having upper and lower walls, front and rear walls and rearwardly converging side walls, a semi-circular wall within the casting extending from one side wall to the rear wall and dividing the casting into a water compartment in the forward portion of the casting and a substantially circular air cleaner compartment in the rear portion of the casting, the water compartment having a core receiving opening, a second opening in the water compartment, a conduit leading from the water jacket of the motor and fixed to said casting over said second opening, the air cleaner compartment having an opening at the top for receiving an air cleaner core, an air stack over said latter opening, a second opening in the bottom of said air cleaner compartment, a container fixed to the bottom of the casting and disposed over the latter opening, a third opening leading into said air cleaner compartment, a conduit extending from said third opening to the carburetor of the motor, a second inwardly curved wall within the casting extending from the opposite side wall to the rear wall and forming a vertically disposed passage in the casting, an exhaust stack supported by the casting over said passage, and an exhaust pipe connected to the exhaust manifold of the motor and extending upwardly through said passage and connected to said exhaust stack.

9. In a tractor motor, a radiator head member comprising a generally rectangular casing having a bottom wall provided with a radiator receiving opening and a water inlet, and a rear wall including means forming a separate compartment therein adapted for the reception of air conditioning means.

10. In a tractor motor, a radiator head casting comprising a generally rectangular casing having wall means forming a water chamber with a radiator receiving opening therein and an inlet opening, said wall means including side walls and a reentrant wall portion disposed between said side walls and adapted for the reception of exhaust pipe means between said side walls.

11. In a tractor motor, a radiator head member comprising a generally rectangular casing including a water chamber and side walls, and wall means disposed between said side walls and forming a compartment separate from said water chamber and disposed between the planes of said side walls.

12. In a tractor motor having a water jacket, a carburetor, and an exhaust manifold, the combination of a radiator for said motor and including a radiator head, means serving as an air chamber carried thereby, air cleaning means supported by and communicating with said chamber, conduit means connecting said chamber with the carburetor of said motor, an exhaust muffler supported on said radiator head, conduit means connecting said muffler with said exhaust manifold, and means establishing communication between the radiator and said water jacket.

13. In a tractor motor having a carburetor, a water jacket and an exhaust manifold, the combination of a radiator for the motor and including a radiator head having side walls coinciding generally with the sides of the radiator, means serving as an air chamber carried by said radiator head inwardly of one side wall thereof, air conditioning means associated with said chamber, conduit means connecting said chamber with said carburetor, an exhaust muffler carried by said head inwardly of the other side wall of the latter, conduit means connecting said muffler with said exhaust manifold, a water chamber formed in said radiator head and including a portion disposed between said air chamber and the portion of the radiator head carrying said muffler, and conduit means connecting the last named portion of the water chamber with the water jacket of said motor.

14. In a tractor motor having a crank case, a water jacket, and a carburetor, the combination of a radiator for the motor including a radiator head having a water chamber, means carried thereby and serving as a separate air chamber adapted to receive air conditioning means, conduit means leading from said air chamber to said carburetor, separate conduit means leading from said water chamber to the water jacket of the motor, and means establishing communication between the air chamber carried by said radiator head and the crank case of said motor.

15. In a tractor motor having a water jacket and a carburetor, the combination of a radiator casting having an integral water compartment and means serving as an air cleaner compartment carried thereby, the water compartment having a core receiving opening and a second opening formed therein, a conduit leading from the water jacket of the motor and fixedly secured to the water compartment of said casting over said second opening, and a conduit connecting the air cleaner compartment with the carburetor of the motor, the sides of said casting and said conduits being confined within lines extending from the operator's position on the tractor to the sides of the radiator, thereby providing an unobstructed view to the operator on both sides of the tractor.

16. In a tractor motor having a water jacket, a carburetor, and an exhaust manifold, the combination of a radiator casting having a water compartment therein, means serving as an air cleaner compartment carried by said casting, a conduit leading from the water jacket of the motor to said water compartment, the air cleaner compartment having an opening for receiving an air cleaner core and another opening leading from said air cleaner compartment, a conduit connecting the latter opening with the carburetor of the motor, an exhaust pipe connected with the exhaust manifold of the motor and extending forwardly and upwardly, one wall of said casting being curved inwardly to provide a space to receive said exhaust pipe, an exhaust stack carried by said casting above said space and having the upper end of said exhaust pipe connected thereof, and an intake pipe leading into said air compartment, said intake pipe, said exhaust pipe, said conduits and the two sides of said casting being confined within lines extending from the operator's position on the tractor to the sides of the radiator to provide an unobstructed view.

17. In a tractor motor, a radiator head casting comprising a generally rectangular casing having wall means forming a water chamber with a radiator receiving opening therein and an inlet opening, said wall means including side walls and a reentrant wall portion disposed between said side walls and adjacent one of the side walls for the reception of exhaust pipe means between said side walls, an exhaust stack communicating with said exhaust pipe means and disposed adjacent said one side wall of said casting, and an air intake pipe carried by said casting adjacent the other side wall thereof.

ELMER McCORMICK.